United States Patent
Hohenthanner et al.

(10) Patent No.: US 7,285,307 B2
(45) Date of Patent: Oct. 23, 2007

(54) PROCESS FOR PRODUCING CATALYST-COATED MEMBRANES AND MEMBRANE-ELECTRODE ASSEMBLIES FOR FUEL CELLS

(75) Inventors: Claus-Rupert Hohenthanner, Hanau (DE); Franz Greinemann, Bruchköbel (DE); Peter Seipel, Alzenau (DE)

(73) Assignee: Umicore AG & Co KG, Hanau-Wolfgang (DE)

( * ) Notice: Subject to any disclaimer, the term of this patent is extended or adjusted under 35 U.S.C. 154(b) by 372 days.

(21) Appl. No.: 10/374,495

(22) Filed: Feb. 26, 2003

(65) Prior Publication Data
US 2004/0124091 A1 Jul. 1, 2004

(30) Foreign Application Priority Data
Feb. 28, 2002 (EP) .................................. 02004598

(51) Int. Cl.
B05D 5/00 (2006.01)
B05D 5/12 (2006.01)
B05D 3/02 (2006.01)
B05D 3/06 (2006.01)
B05D 1/38 (2006.01)
H05H 1/46 (2006.01)

(52) U.S. Cl. .................... 427/243; 427/536; 427/541; 427/542; 427/543; 427/544; 427/377; 427/378

(58) Field of Classification Search ............... None
See application file for complete search history.

(56) References Cited

U.S. PATENT DOCUMENTS

| | | | |
|---|---|---|---|
| 5,211,984 A | 5/1993 | Wilson | |
| 6,156,449 A * | 12/2000 | Zuber et al. | 429/42 |
| 6,197,147 B1 * | 3/2001 | Bonsel et al. | 156/269 |
| 6,309,772 B1 * | 10/2001 | Zuber et al. | 429/33 |
| 6,524,736 B1 * | 2/2003 | Sompalli et al. | 429/42 |
| 6,933,003 B2 * | 8/2005 | Yan | 427/115 |
| 6,946,211 B1 * | 9/2005 | Bjerrum et al. | 429/33 |
| 6,998,149 B2 * | 2/2006 | Kohler et al. | 427/115 |
| 2002/0064593 A1 * | 5/2002 | Kohler et al. | 427/115 |
| 2005/0067345 A1 * | 3/2005 | Prugh et al. | 210/500.27 |
| 2007/0077350 A1 * | 4/2007 | Hohenthanner et al. | 427/115 |

FOREIGN PATENT DOCUMENTS

| | | |
|---|---|---|
| DE | 198 12 592 A | 10/1999 |
| EP | 1 037 295 A | 9/2000 |
| EP | 1 198 021 A2 | 4/2002 |
| JP | 58-64102 A * | 4/1983 ................ 427/244 |
| JP | 07 176317 A | 7/1995 |
| JP | 2001 160405 A | 6/2001 |
| JP | 2001-160405 A * | 6/2001 |
| WO | WO 97 23916 A | 7/1997 |
| WO | WO 97 23919 A | 7/1997 |

OTHER PUBLICATIONS

Translation of JP 2001-160405 A to Masaru Yoshitake et al. "Method for Manufacturing Proton-Exchange Membrane Fuel Cell", published Jun. 12, 2001.*
European Search Report, OMG AG & Co. KG, Sep. 3, 2002.

* cited by examiner

Primary Examiner—Marianne Padgett
(74) Attorney, Agent, or Firm—Kalow & Springut LLP; John J. Santalone

(57) ABSTRACT

The present invention provides a continuous process for producing catalyst-coated polymeric electrolyte membranes and membrane electrode assemblies for fuel cells. The process of the invention uses an ionomer membrane having a polymeric backing film on the back side. After the first coating step, the membrane is dried, during which the residual solvent may be almost completely removed. After this, the polymeric backing film is removed and the back side of the membrane is coated in a second step. The front and back sides of the membrane can be coated by various methods, such as screen printing or stencil printing. Two gas distribution layers are applied to the two sides of the catalyst-coated membrane to produce a 5-layer membrane electrode assembly. The membrane electrode assemblies are used in polymeric electrolyte membrane fuel cells and in direct methanol fuel cells.

20 Claims, No Drawings

PROCESS FOR PRODUCING CATALYST-COATED MEMBRANES AND MEMBRANE-ELECTRODE ASSEMBLIES FOR FUEL CELLS

FIELD OF THE INVENTION

The invention relates to a process for producing catalyst-coated membranes for polymer electrolyte membrane fuel cells that are particularly suitable for continuous production. The invention also includes the use of these catalyst-coated membranes to produce membrane electrode assemblies.

BACKGROUND OF THE INVENTION

Fuel cells convert a fuel and an oxidant, locally separated from each other at two electrodes, into electrical current, heat and water. The fuel can be hydrogen, methanol, or a gas rich in hydrogen. Oxygen or air serves as the oxidant. The process of energy conversion in the fuel cell is distinguished by its being largely free of pollutants and by a particularly high efficiency. For those reasons, fuel cells are gaining increasing importance for alternative power concepts, home energy supply systems and portable applications.

Membrane fuel cells such as polymer electrolyte fuel cells (PEMFC) and direct methanol fuel cells (DMFC) are suitable for many mobile and stationary areas of application because of their low operating temperatures, compact construction and power density.

Polymer electrolyte membrane (PEM) fuel cells are constructed as stacks of numerous fuel cell units. They are electrically connected in series to increase the working voltage. Each fuel cell unit contains a 5-layer membrane electrode assembly (MEA) placed between bipolar plates, also called separator plates, for gas introduction and as current leads. One such 5-layer membrane electrode assembly is, in turn, built up of a polymer electrolyte membrane that has an electrode layer on each side (3-layer catalyst-coated membrane, CCM). Then so-called gas distribution layers (GDLs) are applied to both sides of the CCM, thus producing a 5-layer membrane electrode assembly.

One of the electrode layers is made as the anode for oxidation of hydrogen, and the second electrode layer is made as the cathode for reduction of oxygen.

The gas distribution layers are usually made of carbon fiber paper or carbon fiber cloth. They allow good access of the reaction gases to the reaction layers and good conduction of the current away from the cell and the water that is produced.

The electrode layers for the anode and cathode contain a polymer that conducts protons and electrocatalysts, which catalytically support the particular reaction (oxidation of hydrogen or reduction of oxygen). Metals of the platinum group of the periodic table of the elements are preferred as catalytically active components. In most cases, so-called supported catalysts are used, in which the catalytically active platinum group metals are applied to the surface of a conductive support material such as carbon black.

The polymer electrolyte membrane comprises polymeric materials that conduct protons. These materials are also called ionomers. It is preferred to use a tetrafluoroethylene-fluorovinyl ether copolymer with sulfonic acid groups. This material can, for example, be obtained from DuPont under the tradename "Nafion®." However, other ionomeric materials, especially some that do not contain fluorine, such as doped sulfonated polyetherketones or doped sulfonated or sulfinated arylketones or polybenzimidazoles can also be used. Suitable ionomer materials are described by the prior art. For use in fuel cells, these membranes need to have thicknesses generally between 10 and 200 µm.

Catalyst-coated membranes (3-layer CCMs) are usually prepared by applying the electrode layers to the polymer electrolyte membrane by printing, doctor blade coating, rolling or spraying, using a pasty preparation. The pasty preparations are called inks or catalyst inks and they generally contain, along with the supported catalyst, a proton-conducting material, various solvents, and optionally finely divided hydrophobic materials and pore-formers. The catalyst inks can be differentiated by the nature of the solvent used. There are inks that contain predominantly organic solvents, and inks that use predominantly water as the solvent. For instance, the prior art discloses catalyst inks that contain a mixture of water and glycolic solvents and catalyst inks in which only water is used as the solvent.

The gas distribution layers (GDLs) usually consist of coarse-pored carbon fiber paper or carbon fiber cloth with porosities of up to 90%. These materials are impregnated with hydrophobic materials, such as dispersions of polytetrafluoroethylene (PTFE) to prevent flooding of the pore system with reaction water produced at the cathode. To improve the electrical contact between the electrode layers and the gas distribution layers, those are often coated on the side toward the particular electrode layer with a "balancing layer" of carbon black and a fluoropolymer ("microlayer"). In addition, the gas distribution layers themselves can be supplied with an electrocatalyst layer. Thereby so-called catalyzed GDLs are obtained. In any case, as already discussed, one gets a 5-layer membrane electrode assembly by applying two GDLs to the two sides of a CCM.

Commercialization of the PEM fuel cell technology requires processes for mass production of catalyst-coated membranes (CCMs) and for membrane electrode assemblies so that they are available in large numbers for mobile, stationary and portable applications.

It is known in the art that one can coat the polymer electrolyte membrane using the transfer or decal process. This process uses membranes in the ion-exchanged form (e.g., the $Na^+$ form) and yields thin catalyst coatings with layer thicknesses less than 10 µm. This process involves many steps, is tedious, expensive, and therefore suitable only for small-scale production.

Continuous processes for coating the polymer electrolyte membrane are known in the art. Some prior art references disclose a coating process for continuous production of a composite of electrode material, catalyst material and an ionomeneric membrane, in which an electrode layer on a carrier is produced from a catalytic powder comprising the electrode material, the catalyst material and the ionomeric material. This electrode layer is heated on the side away from the carrier to soften the ionomeric material and rolled onto the ionomeric membrane under pressure. The rolling process can cause damage to the ionomeric membrane and to the electrode layer.

Other prior art references disclose continuous processes for coating a polymer electrolyte membrane with electrode layers, in which a ribbon-like ionomeric membrane is pulled through a bath of a platinum salt solution. The salt that adheres is then reduced to the noble metal in a gas stream or in another bath. Selective coating, i.e., application of the electrode layer to the membrane in a desired pattern, is not possible with this process. Also, only very small amounts of catalytically active material can be applied to the membrane with this process.

Some prior art references disclose processes for continuous production of material composites in which the material composites consist of several functional materials. These composites can be used in fuel cells and fluid preparations containing the catalytic material (catalyst inks) can be used to produce the catalyst layers.

Other prior art references disclose processes for producing membrane electrode assemblies in which the polymer electrolyte membrane, the electrode layers and the gas diffusion layers are combined continuously in a rolling process.

Continuous processes are also used for selective application of electrode layers to a ribbon-shaped ionomeric membrane in which the front and back sides of the membrane are printed. For these processes, the polymer electrolyte membrane should have certain water content (less than 20%). Because of the dimensional changes of the membrane during the coating process, it is difficult to position the printing on the front and back sides accurately, especially with thin membranes (less than 50 µm thick).

Other continuous processes for coating an ionomeric membrane involve using a membrane that is pre-swollen in an organic solvent, then coated and shrinkage during drying is prevented by clamps. These processes have many problems, because the pre-swelling of the membrane cannot be controlled precisely. Because of the excess swelling and the resulting expansion of the membrane, exact positioning cannot be attained in the subsequent printing. Furthermore, the soft, rubbery ionomer membrane can easily be damaged in its swollen condition by the tension of the clamps.

The prior art also discloses processes for the manufacture of catalyst coated ion exchange membranes using a base material, where the membrane is fixed on a base material, such as polyethylene terephthalate, PTFE, or glass slides, then coated. After drying the base material is peeled off. For coating the second side the membrane is fixed on another base material by means of an adhesive tape. Thus, both first and second side coating require the use of the base material. As base materials, foils made of polymers such as PET and PTFE, but also glass slides (made of Pyrex) are disclosed.

Based on the current state of the art, there is still a need for processes that allow ionomeric membranes to be coated with a catalyst continuously on both sides with high positional accuracy and without damage to the membrane. There is also a need to process these catalyst-coated membranes (3-layer CCMs) into 5-layer membrane electrode assemblies by combining them with gas distribution layers.

SUMMARY OF THE INVENTION

The present invention provides processes that allow polymer electrolyte membrane membranes to be coated with a catalyst continuously on both sides with high positional accuracy and without damage to the membrane. These polymer electrolyte membranes can easily be combined with gas distribution layers.

In one embodiment, the present invention provides a process for coating a polymer electrolyte membrane comprising providing a polymer electrolyte membrane, the front of the polymer electrolyte membrane coated with a catalyst layer, the back of the polymer electrolyte membrane having a backing film; and removing the backing film from the polymer electrolyte membrane and coating the back of the polymer electrolyte membrane with a second catalyst layer, thereby coating the polymer electrolyte membrane.

In another embodiment, the present invention provides a process for producing a polymer electrolyte membrane coated on front and back, comprising coating a polymer electrolyte membrane on the front with a catalyst, the polymer electrolyte membrane having a backing film on the back; and removing the backing film from the polymer electrolyte membrane and coating the back of the polymer electrolyte membrane with a second catalyst, wherein the coating of the second catalyst is conducted without the backing film, thereby producing the polymer electrolyte membrane coated on front and back.

In a further embodiment, the present invention provides a process for producing a polymer electrolyte membrane coated with catalyst on both sides, for fuel cells comprising: providing a polymer-electrode membrane with a backing film on the back; coating the front side of the polymer electrolyte membrane with a first electrode layer using a catalyst ink and drying the coating on the front side of the polymer electrolyte membrane at an elevated temperature; removing the backing film from the back of the polymer electrolyte membrane; coating the back side of the polymer electrolyte membrane with a second electrode layer; and treating the polymer electrolyte membrane, which is coated on both sides with catalyst, with water at an elevated temperature.

For a better understanding of the present invention together with other and further advantages and embodiments, reference is made to the following description taken in conjunction with the examples, the scope of which is set forth in the appended claims.

DETAILED DESCRIPTION OF THE INVENTION

The invention will now be described in connection with preferred embodiments. These embodiments are presented to aid in understanding of the present invention and are not intended to, and should not be construed to, limit the invention in any way. All alternatives, modifications and equivalents, which may become obvious to those of ordinary skill on reading the disclosure are included within the spirit and scope of the present invention.

This disclosure is not a primer on processes for producing or coating a polymer electrolyte membrane with catalysts, basic concepts known to those skilled in the art have not been set forth in detail.

According to one aspect of the invention, an ionomeric membrane having a polymeric backing film on the back is used. This supported membrane is coated on the front side with a first electrode layer. After this first electrode layer has dried, the polymeric backing film is removed and the back side of the membrane is coated. After subsequent drying, the catalyst-coated membrane is post-treated in the water bath, rinsed and coiled. Various processes can either partially or completely coat the front and/or back sides. Examples include screen printing, stenciling, halftone printing, doctor blade coating, or spraying. Then two gas distribution layers are applied to the two sides of the 3-layer CCM to produce a 5-layer membrane electrode assembly.

The process can handle, preferably, polymer electrolyte membranes of polymeric perfluorinated sulfonic acid compounds, doped polybenzimidazoles, polyether ketones or polysulfones in the acid or base form. Polymeric films of polyester, polyethylene, polypropylene, polycarbonate, polyimide or similar polymeric materials or derivatives thereof are suitable for use as backing films for the back side of the polymer electrolyte membrane.

It has been shown that use of an ionomeric membrane supported on the back side by a polymeric film reduces expansion of the membrane in length and width (x and y directions) in the first coating step (especially on contact with the solvent for the ink). In particular, there is no bulging or wrinkling with large printing formats (i.e., CCMs with active areas greater than 200 cm$^2$) and thin ionomeric membranes (less than 50 μm thick).

It is also found, surprisingly, that after removal of the backing film the back side of the already coated ionomeric membrane can be printed with high positional accuracy if the previous drying process is conducted so that the ionomeric membrane coated on one side contains the least possible solvent residue. According to the invention, the parameters of the drying process are set so that the residual solvent content of the coated membrane before the second coating step is between 0 and 5% by weight, preferably between 0 and 3% by weight. If the content of residual solvent is higher, excessive bulging occurs in the second coating process, resulting in wrinkling. The residual solvent content is determined by determining the weight loss of a coated sample after drying at 120° C. in a circulating-air drying oven.

Suitable continuous drying processes include, among others, hot air drying, infrared drying, microwaves, plasma, or combinations thereof The drying profile (time and temperature) is set so as to attain the lowest possible residual solvent content. Suitable temperatures are from 40 to 150° C. or more preferably, from 50 to 150° C., and suitable times are from 1 to 30 minutes.

The positional accuracy between the front and back printing attainable with the process is in the range of 0.05 to 0.2 mm. Because of that, it is possible to apply the first electrode layer in a desired pattern on the front of the polymer electrolyte membrane and to coat the back of the polymer electrolyte membrane with the second electrode layer with a positional accuracy of 0.05 to 0.2 mm with respect to the pattern on the front side.

The electrode layers on the two sides of the membrane can be different from each other. They can be made up of different catalyst inks and different proportions of catalyst and noble metal loadings (mg Pt/cm$^2$).

Different electrocatalysts (supported catalysts containing noble metals, those which do not contain noble metals, and unsupported metal blacks) can be used.

The first coating step (using membrane supported by the backing film) can be done in a single or multiple coating processes, while the printing on the back (after removal of the backing film) is preferably done as a single-step coating process. However, other combinations of processes are also possible.

Having now generally described the invention, the same may be more readily understood through the following references to the following examples, which are provided by way of illustration and are not intended to limit the present invention unless specified.

EXAMPLES

Example 1

A catalyst ink with the following composition was used to produce a membrane electrode assembly by the process according to the invention:

Composition of the Catalyst Ink (Anode and Cathode):

| | |
|---|---|
| 15.0 g | supported platinum catalyst (40% by weight platinum on carbon black, from OMG) |
| 44.0 g | Nafion ® solution (11.4% by weight in water) |
| 41.0 g | dipropylene glycol |
| 100.0 g | |

The catalyst was suspended in the aqueous Nafion solution with a disperser.

A ribbon of a polymer electrolyte membrane (Nafion® 112, DuPont; H$^+$ form, 50 μm thick) 30 cm wide and 100 m long, supported on one side by a polyester film laminated to it, was first coated on the front side with the catalyst ink by a screen printing process in a continuous roll-to-roll coating system (constructed as described in EP 1 037295). The coating area is 100 cm$^2$ (format dimensions 10×10 cm). After printing, the coated membrane was dried with hot air in a continuous ribbon drier. A slowly increasing drying profile was used with a high flow of hot air, and the profile was adjusted so that the residual solvent content of the coated membrane after drying was 2.3% by weight. (Maximum temperature: 95° C.; total drying time: 8 minutes). After drying, the membrane was rolled with a coiling machine. Before printing on the back side, the membrane was unwound and turned, wound up again, and then put back into the coating system. Before coating the back side, the backing film was pulled off and rolled onto a second winder roll. The back side of the unsupported membrane was coated with the same catalyst ink in a single printing pass. The drying profile was adjusted to a maximum temperature of 75° C. and a total drying time of 5 minutes.

After printing the back side, the catalyst-coated membrane (CCM) was rinsed in deionized water at 80° C. The CCM had a total platinum loading of 0.4 mg Pt/cm$^2$ (0.2 mg Pt/cm$^2$ on each side).

An active area of 50 cm$^2$ was cut out of the CCM for electrochemical testing, and processed into a 5-layer membrane electrode assembly (MEA). That was done by applying hydrophobic-treated carbon fiber paper (Toray TGPH-060 type, 200 μm thick) to both sides of the CCM and making the composite by hot-pressing at 130° C. and a pressure of 70 bar.

The MEA prepared in that manner was installed in an appropriate single PEMFC cell. The power tests used H$_2$ as the anode gas and air as the cathode gas. The cell temperature was 80° C. The anode was humidified at 80° C. and the cathode at 65° C. The pressure of the working gases was 1.5 bar (absolute). The gas stoichiometry was 1.1 (hydrogen) and 1.5 (cathode gas). The cell voltage was measured at 670 mV at a current density of 600 mA/cm$^2$. That is equivalent to a power of about 0.4 W/cm$^2$.

Example 2

A MEA was produced for use with a reformate gas containing hydrogen. An ionomer membrane 30 μm thick on a backing film of polyester was used. The printed format was 15×15 cm (active area 225 cm$^2$).

Composition of the Anode Ink:

| | |
|---|---|
| 15.0 g | PtRu supported catalyst (40% by weight PtRu on carbon black: 26.4% by weight Pt, 13.6% by weight Ru; catalyst equivalent to U.S. Pat. No. 6,007,934) |
| 60.0 g | Nafion ® solution (10% by weight in water) |
| 15.0 g | deionized water |
| 10.0 g | propylene glycol |
| 100.0 g | |

The 30 μm thick polymer electrolyte membrane was first coated with anode ink on the front side in a single printing pass. The subsequent drying was done so that the residual solvent content of the membrane coated on one side was 1.2% by weight. That required a drying profile with a maximum temperature of 105° C. and a residence time of 5 minutes in a continuous hot air dryer. After removing the backing film, the back side was printed in a single pass using the catalyst ink specified in Example 1 and again dried, as in Example 1. Finally the CCM was rinsed in 80° C. deionized water. The noble metal loading of the catalyst-coated membrane was 0.4 mg PtRu/cm$^2$ on the anode and 0.3 mg Pt/cm$^2$ on the cathode.

A sample with an active area of 50 cm$^2$ was cut out of the CCM. Two gas distribution layers (consisting of hydrophobized carbon fiber paper, Toray TGPH-060) were applied to the front and back of the CCM and the composite was made by hot pressing at 130° C. at a pressure of 70 bar.

The MEA produced in that manner was studied in a fuel cell test stand. The power tests used a reformate gas mixture containing 45% by volume $H_2$, 30% by volume $N_2$, 23% by volume $CO_2$ and 50 ppm CO with an air bleed of 2% air by volume. Air was used as the cathode gas. The cell temperature was 70° C. The anode was humidified at 85° C. and the cathode at 55° C. The working gas pressure was 1 bar (absolute). The stoichiometry of the gases was 1.1 (anode gas) and 2.0 (cathode gas). The cell voltage was 620 mV at a current density of 600 mA/cm$^2$ (power density 0.37 W/cm$^2$).

Example 3

An MEA was prepared for use in a direct methanol fuel cell (DMFC).

An ionomer membrane 87.5 μm thick, laminated to a backing polyester film, was used. The print format was 5×5 cm (active area 25 cm$^2$). The polymer electrolyte membrane was first coated on the front side with an anode ink comparable to that described in Example 2 in a stencil printing process (stencil thickness 100 μm). However a 60% by weight PtRu supported catalyst was used instead of a 40% by weight PtRu supported catalyst. The final drying was done so that the residual solvent content of the membrane coated on one side was 3.2% by weight. That required a drying profile with a maximum temperature of 105° C. and a residence time of 7 minutes in the dryer. After removal of the backing film, the back side was also printed in a stencil process using the catalyst ink described in Example 1 and dried. Finally, the CCM thus prepared was rinsed in 80° C. deionized water. The noble metal loading of the catalyst-coated membrane was 1 mg PtRu/cm$^2$ for the anode and 0.6 mg Pt/cm$^2$ for the cathode.

Two gas distribution layers (comprising hydrophobized carbon fiber paper) were applied to the front and back of the CCM to produce a 5-layer MEA, and the composite was made by hot pressing at 140° C. and a pressure of 60 bar. The MEA produced in that manner was tested in a DMFC fuel cell test stand. The active cell area was 25 cm$^2$. The power tests used a 2 molar solution of methanol in water. The methanol flow rate was 4 ml/minute. The cell temperature was 60° C. Air was used as the cathode gas. The maximum power density measured for this cell was 65 mW/cm$^2$.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with known or customary practice within the art to which the invention pertains and as may be applied to the essential features herein before set forth and as follows in the scope of the appended claims.

What is claimed:

1. A process for producing a 3-layer catalyst coated membrane suitable for use with a fuel cell, the process comprising the steps of:
    (a) coating a polymer electrolyte membrane, having a front side and a back side, on the front side with a first catalyst ink suitable for use with a fuel cell, wherein the back side of the polymer electrolyte membrane has a backing film;
    (b) drying the polymer electrolyte membrane resulting from step (a) to a residual solvent content of less than 5% by weight based on the total weight of the polymer electrolyte membrane, including the first catalyst coating and the backing film;
    (c) removing the backing film from the polymer electrolyte membrane; and
    (d) coating the back side of the polymer electrolyte membrane with a second catalyst ink suitable for use with a fuel cell so as to produce a 3-layer catalyst coated membrane, wherein the coating of the back side of the polymer electrolyte membrane is conducted without the backing film being present and without the presence of gas distribution layers on the membrane.

2. A process according to claim 1, wherein the polymer electrolyte membrane consist of a polymeric material selected from the group consisting of perfluorinated sulfonic acid compounds, doped polybenzinxidazols, polyother ketones, and polysulfones, in acid or base form.

3. A process according to claim 1, wherein the backing film on the back of the polymer electrolyte membrane consists of polymers selected from the group, consisting of polyesters, polyethylenes, polypropylenes, polycarbonates, polyimides or and polymeric derivatives thereof.

4. A process according to claim 1, wherein the drying of step (b) is performed using hot air, infrared, microwaves, plasma, or combinations thereof.

5. A process according to claim 4, wherein the drying temperature is from 50 to 150° C. and the drying time is from 1 to 30 minutes.

6. A process according to claim 1, which further comprises treating the 3-layer catalyst coated membrane of step (d) in deionized water at a temperature of 20 to 90° C.

7. The process according to claim 1, wherein the coating of the polymer electrolyte membrane with the first catalyst ink on the front side is performed in a desired pattern and the back of the polymer electrolyte membrane is coated with the second catalyst ink with a positional accuracy in the range of 0.05 to 0.2 mm with respect to the pattern on the front side.

8. A process for producing a ribbon-shaped 3-layer catalyst coated membrane suitable for use with of fuel cell, the process comprising the steps of:
(a) providing a ribbon-shaped polymer electrolyte membrane having front and back sides, wherein the polymer electrolyte membrane has a backing film on the back side;
(b) coating the front side of the polymer electrolyte membrane with a first electrode layer using a first catalyst ink and drying the coating on the front side of the polymer electrolyte membrane at an elevated temperature so tat a residual solvent content of less than 5% by weight is obtained, based on the total weight of the polymer electrolyte membrane, including the first electrode layer and the backing film;
(c) removing the backing film from the back side of the polymer electrolyte membrane;
(d) coating the back side of the polymer electrolyte membrane with a second electrode layer using a second catalyst ink, wherein the coating of the back side is conducted without the backing film being present or a gas distribution layer being present on the membrane:
(e) drying the polymer electrolyte membrane coated with the first and second electrode layers at elevated temperatures so as to form a 3-layer catalyst coated membrane suitable for use in a fuel cell; and
(f) treating the 3-layer catalyst coated membrane with water at an elevated temperature.

9. A process according to claim 1 or 8, wherein the coating is applied by screen printing, offset printing, stencil printing, halftone printing, doctor-blade coating or spraying.

10. A process according to claim 8, wherein the polymer electrolyte membrane consists of a polymeric material selected from the group consisting of perfluorinated sulfonic acid compounds, doped polybenzimidazols, polyether ketones, and polysulfones, in acid or base form.

11. A process according to claim 8, wherein the backing film on the back side of the polymer electrolyte membrane consists of polymers selected from the group consisting of polyesters, polyethylenes, polypropylenes, polycarbonates, polyimides and polymeric derivatives thereof.

12. A process according to claim 8, wherein the electrode layers are dried using hot air, infrared, microwaves, plasma, or combinations thereof.

13. A process according to claim 8, wherein the drying in steps (b) and (e) is performed at a temperature from 50 to 150° C. and the drying time is from 1 to 30 minutes.

14. A process according to claim 8, wherein the treatment of the polymer electrolyte membrane in step (f) is done in deionized water at a temperature of 20 to 90° C.

15. The process according to claim 8, wherein the coating of the polymer electrolyte membrane with the first electrode layer on the front side is performed in a desired pattern and the back of the polymer electrolyte membrane is coated with the second electrode layer with a positional accuracy in the range of 0.05 to 0.2 mm wit respect to the pattern on the front side.

16. The process according to claim 1 or 8, wherein the drying in step (b) is performed so that a residual solvent content of less than 3% by weight is obtained.

17. The process according to claim 1 or 8, wherein the first catalyst ink and the second catalyst ink are the same or different and each independently contains a supported catalyst, a proton-conducting material and one or more solvents.

18. The process according to claim 1 or 8, wherein the first catalyst ink and the second catalyst ink are the same or different and each independently contains a supported Pt catalyst or a supported PtRu catalyst.

19. The process according to claim 1 or 8, wherein the 3-layer catalyst coated membrane has a large printing format with an active area greater than 200 cm$^2$.

20. The process according to claim 1 or 8, wherein the polymer electrolyte membrane has a thickness of less than 50 μm.

* * * * *